Dec. 1, 1964   A. M. CHREITZBERG   3,159,508
GAS PERMEABLE CONTAINER
Filed Aug. 29, 1961

*INVENTOR.*
AUGUSTUS M. CHREITZBERG

3,159,508
GAS PERMEABLE CONTAINER
Augustus M. Chreitzberg, Raleigh, N.C., assignor to The Electric Storage Battery Company, a corporation of New Jersey
Filed Aug. 29, 1961, Ser. No. 134,721
7 Claims. (Cl. 136—166)

The present invention generally relates to gas permeable seals and containers. More specifically, the present invention is concerned with a new and improved means for increasing the permeability of plastics to hydrogen.

While not limited thereto, the present invention is particularly adapted for use as a sealing means or container for electric batteries. It has long been recognized that it is desirable to operate electric batteries, particularly those of the rechargeable type, in the sealed condition, to prevent the loss of electrolyte therefrom, eliminate frequent servicing, and to prevent contamination of the battery by foreign impurities. To this end, it has been proposed to provide means in a battery to re-combine the gases evolved during battery operation with the active materials of the electrodes. As will be understood by those skilled in the art, oxygen and hydrogen are the gases normally evolved during battery operation. It has long been acknowledged that the re-combination of hydrogen with electrode active material is more difficult to achieve than the recombination of oxygen with the electrode materials. Accordingly, it has been proposed to proportion the active material between the positive and negative electrodes in such a manner that oxygen is preferentially evolved during normal cell operation, thus preventing an undue build-up of gas pressure within a sealed cell. While the preferential evolution of oxygen can readily be achieved, a certain amount of hydrogen will nonetheless be evolved both on battery stand and during operation which can give rise to large pressures within the battery container.

It is therefore an object of the present invention to provide a new and improved battery container and/or battery seal having a substantially increased permeability to hydrogen without a corresponding increase in permeability to oxygen.

Another object of the present invention is to provide a battery case and/or seal which will prevent an undue build-up of hydrogen pressure therein while keeping the advantages of a sealed cell.

Since the build-up of gas pressure, particularly the pressure due to hydrogen evolution, has long been a problem in the sealed battery art, many attempts have been made to solve the problem. For example, mechanical pressure relief valves have long been known, but such means have proven to be unreliable and in general unable to withstand the highly corrosive environment which generally attends battery operation. It has also been proposed to provide in a battery container a gas permeable diaphragm of a plastic material such as polyvinyl chloride or polyethylene which is to a certain degree permeable to hydrogen and to a much lesser degree to oxygen for the relief of internal gas pressure. It has been found, however, that such plastics while possessing the characteristics described are not permeable to the extent required to maintain a safe pressure level within a sealed battery container.

In accordance with the present invention metallic additives in the form of finely ground powders of the type which are known to have high affinities for hydrogen are dispersed in the plastic battery container or in the plastic compositions used to seal the container. These additions have been found to substantially increase the diffusion rate of hydrogen through these plastics. The particular metals found applicable for incorporation in the plastic of the battery container or battery seal are those metals which are the members of the platinum family including ruthenium, rhodium, palladium, osmium, iridium, and platinum, and in addition, silver and Raney nickel, all of which metals are known to have a high affinity for hydrogen. The concentration of these additives in the particular plastics utilized depends in part on the extent of the utilization of the loaded plastic in the battery container. If it is only used in the top seal, a greater amount of course will be required to achieve a given rate of hydrogen diffusion than if it is included in the entire cell container. In any event, however, it has been found that the upper limit of the loading of the plastic is that point at which the plastic ceases to be an insulating material and becomes conductive. The metallic additives mentioned may be included in any of the conventional plastic battery containers and sealing compositions known in the art which include polystyrene, nylon, epoxy resins, polyesters and rubber based materials. While the mechanism which makes possible the reduction of hydrogen pressure in a battery utilizing a container or sealing means in accordance with the present invention is not fully understood, it is believed to be both an absorption and a diffusion process. In this respect it is also believed that the early relief of hydrogen pressure is due to the absorption of hydrogen by the metallic additives, followed by a slow release of the absorbed gas by the additives accompanied by an increased diffusion of the gas through the plastic.

Other objects and advantages of the present invention will be apparent from the following detailed description of preferred embodiments thereof when read with reference to the accompanying drawings of which:

Figure 1:
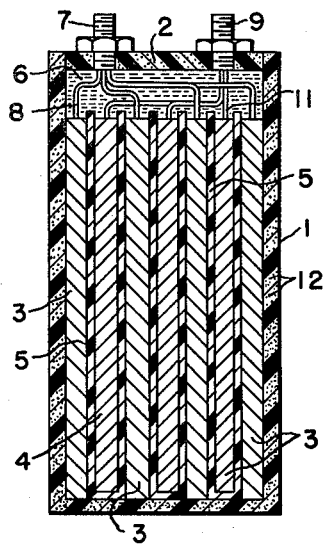
FIG. 1 is a side elevation taken in section of a battery having a container in accordance with the present invention.

Referring now to FIG. 1, the numeral 1 designates a cell container in accordance with the present invention which is adapted to be sealed by means of a top seal 2. The cell container 1 houses a battery element consisting of a plurality of alternate negative electrodes 3 and positive electrodes 4 surrounded by separators 5 immersed in a suitable electrolyte 6. Each of the negative electrodes 3 is connected to the negative terminal of the battery 7 by means of a conductor 8. Similarly, each of the positive electrodes 4 is connected to the positive terminal of the battery 9 by means of a conductor 11. The terminals 7 and 9 pass through the top seal 2 of the container 1 and are themselves sealed therein. It should be understood that the cell element itself does not comprise a part of the present invention and may contain electrodes of any conventional battery system, either of the alkaline or of the acid type. It should be noted, however, that inasmuch as the container for the cell element is to be sealed, that it is desirable that the active materials of the positive and the negative electrodes, be proportioned in such a manner that a preferential gas evolution environment exists during cell operation.

In accordance with the present invention, finely divided metallic powders 12 are dispersed throughout or in a selected area of the material comprising the container 1 and/or the seal 2. These metal powder additives are the type known to have high affinity for hydrogen and comprise the members of the platinum group and, in addition, silver and Raney nickel. The members of the platinum group include ruthenium, rhodium, palladium, osminum, iridium, and platinum. The concentrations of these additives in the container or seal material depends on the area of the container or seal in which additive is used. Thus, if the additive is included in only a small area of the container and/or seal the concentration of the additive in that area must be greater to obtain the same increase in permeability as if the additive were distributed throughout the entire cell container and/or seal. In this respect, it has been found that the additive may be utilized in an amount up to that which imparts electrical conductivity to the cell material. The metallic powder additives may be dispersed in the case or seal material prior or during the molding operation or sealing operation and are operable with all the known insulating container materials including polystyrene, nylon, polyethylenes, epoxy resins, polyester or rubber based materials.

Figure 2:
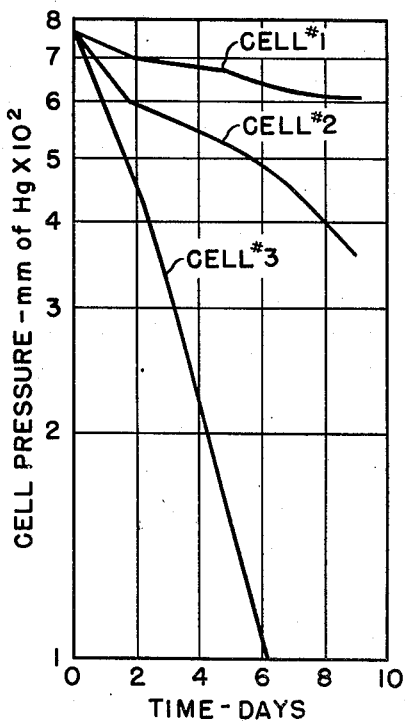
FIG. 2 is a graph illustrating the effect on hydrogen permeability of an additive in accordance with the present invention to a battery seal.

As noted hereinbefore, the mechanism which makes possible the reduction of hydrogen pressure in a battery utilizing a container or seals in accordance with the present invention is not fully understood, but is believed to involve both an absorption and a diffusion mechanism. In order to determine the nature of the mechanism responsible for the reduction of pressure in cells containing additives of the type described, three identical test cells were constructed containing 40% potassium hydroxide electrolyte with silver electrodes immersed therein. Each of the test cells contained a manometer for measuring cell pressure. Three test cells which were molded of polystyrene were assembled and sealed as follows: Cell #1 was sealed with a layer of epoxy resin 0.25" thick; Cell #2 was sealed first with a layer of epoxy resin of the same thickness containing 1% by weight of palladium followed by an overall layer of epoxy resin 0.25" thick with no palladium; and Cell #3 was sealed with a layer of epoxy resin 0.25" thick containing 1% by weight of palladium. Each of the cells was electrolyzed to build up a pressure of hydrogen and oxygen within the cells of 760 mm. of mercury and allowed to stand at room temperature. Referring now to FIG. 2, there is a graph showing the pressure decay curve for these cells observed over a test period of nine days.

As can be seen from the curves in FIG. 2, Cell #3 containing 1% by weight of palladium in the epoxy resin seal had a pressure decay rate approximately twenty times that of Cell #1, the cell having no additive in its sealing layer. If the pressure decay was simply a diffusion process, Cell #1 and Cell #2, the cell with a layer containing the additive and a second layer with no additive, should have had the same pressure decay rates, because diffusion will be limited by the rate of passage through the layer without the palladium. This pressure decay rate should be much less than through the seal containing the additive. Instead, the decay rate for Cell #2 is intermediate that of Cells #1 and #3. Accordingly, it is reasoned that the additive, which in this case was 1% by weight of palladium, is either causing a re-combination of the hydrogen and oxygen in the test cell or is absorbing a large quantity of the gas, which is later released and diffused through the plastic of the containers. Both processes may be occurring.

Figure 3:
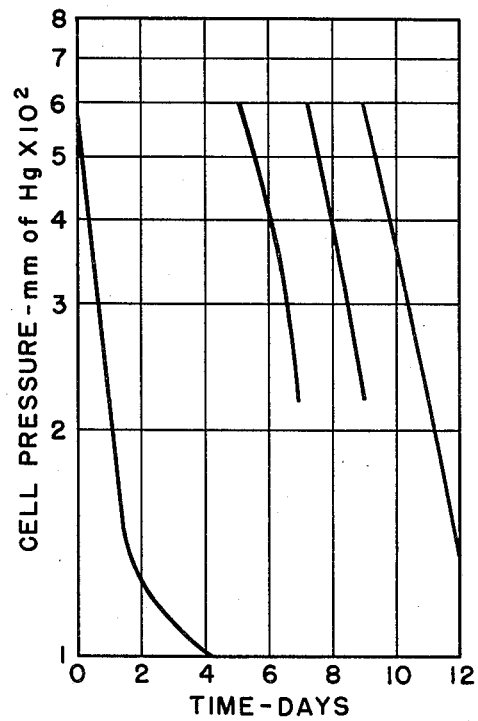
FIG. 3 is a graph illustrating the effect of additives in accordance with the present invention on the permeability of a battery seal under repeated build-up of pressure within a test cell.

Referring now to FIG. 3, there is shown the curves illustrating pressure decay rates for a test cell which was originally electrolyzed to a pressure of 600 mm. of mercury. After a 4-day stand at room temperature, the pressure in this cell had decreased to 100 mm. of mercury. On the 5th, 7th, and 9th days, the cell was again electrolyzed to a pressure of 600 mm. of mercury and each time it decayed at about the same rate as originally. It should be observed that the slope of the decayed curve decreases appreciably at low pressures, the gas mixtures within the cell becoming enriched in oxygen which has a much lower diffusion rate through the cell container and the seal than hydrogen. In this respect, it should be noted that in a battery, oxygen is generally re-combined with the active material of the electrodes more readily than hydrogen and thus, in actual practice, decay rates for batteries would exhibit greater slopes and slopes which decrease less rapidly at low pressure than the test cells.

In considering the addition of finely divided metallic particles of the type having a marked affinity for hydrogen to the material of battery containers to increase the permeability of the container material to hydrogen, it should be noted that this method is more applicable to the relief of hydrogen pressure of the type that occurs slowly such as that evolved during battery stand, rather than to the relief of pressure of the type that builds up rapidly such as that which occurs during overcharge or over-discharge. The reason for this is that the mechanisms which make the present invention operable, namely, absorption and diffusion of hydrogen are not fast reactions. However, the present invention does provide a means for maintaining a safe pressure level within a battery cell container without reliance on mechanical pressure relief valves and the like which have heretofore proven to be unreliable and provide a cell container which to all extents and purposes is at all times completely sealed.

Having described the present invention, that which is claimed as new is:

1. A plastic container for electric batteries characterized by an increased permeability to hydrogen, said container having finely divided metal particles dispersed throughout at least a limited area thereof in an amount insufficient to impart electrical conductivity to the area of dispersal, said metal particles being selected from the group consisting of metals of the platinum group, silver and Raney nickel.

2. A battery container of the type specified in claim 1 wherein said plastic is selected from the group consisting of polystyrene, nylon, polyethylene, epoxy resins, polyester and rubber based materials.

3. An electric battery which is sealed with a plastic sealing composition which has finely divided metal particles selected from the group consisting of metals of the platinum group, silver and Raney nickel dispersed therein in an amount insufficient to impart electrical conductivity to said plastic sealing composition.

4. An electric battery in accordance with claim 3 in which said plastic sealing composition is selected from the group consisting of polystyrene, nylon, polyethylene, epoxy resins, polyesters and rubber based materials.

5. An electric battery in accordance with claim 3 in which said plastic sealing composition is an epoxy resin.

6. A method for sealing an electric battery container which comprises sealing said container with a plastic sealing composition which has finely divided metal particles selected from the group consisting of metals of the platinum group, silver and Raney nickel dispersed therein in an amount insufficient to impart electrical conductivity to said plastic sealing composition.

7. A method in accordance with claim 6 in which the plastic sealing composition is an epoxy resin.

References Cited in the file of this patent
UNITED STATES PATENTS

| | | |
|---|---|---|
| 1,796,746 | Buchholz | Mar. 17, 1931 |
| 2,693,499 | Neumann | Nov. 2, 1954 |
| 2,759,038 | Marsal | Aug. 14, 1956 |